(12) United States Patent
Deng (10) Patent No.: US 11,023,005 B2
(45) Date of Patent: Jun. 1, 2021

(54) TWS EARPHONE, WRISTBAND-TYPE AI VOICE INTERACTION DEVICE, AND SYSTEM

(71) Applicant: Shenzhen Aukey Smart Information Technology Co., Ltd., Shenzhen (CN)

(72) Inventor: Chao Deng, Shenzhen (CN)

(73) Assignee: Shenzhen Aukey Smart Information Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/710,224

(22) Filed: Dec. 11, 2019

(65) Prior Publication Data

US 2020/0110439 A1    Apr. 9, 2020

Related U.S. Application Data

(63) Continuation of application No. PCT/CN2018/087575, filed on May 18, 2018.

(51) Int. Cl.
*G06F 1/16* (2006.01)
*H04W 4/80* (2018.01)
(Continued)

(52) U.S. Cl.
CPC .............. *G06F 1/163* (2013.01); *G06F 3/017* (2013.01); *G06F 3/16* (2013.01); *G06F 40/30* (2020.01);
(Continued)

(58) Field of Classification Search
CPC .......... G06F 1/163; G06F 40/30; G06F 3/017; G06F 3/16; H04W 4/80; H04L 65/60;
(Continued)

(56) References Cited

U.S. PATENT DOCUMENTS

| | | | |
|---|---|---|---|
| 2014/0379341 A1 | 12/2014 | Seo et al. | |
| 2017/0339482 A1* | 11/2017 | Schrems | G06F 1/1626 |
| 2018/0054729 A1* | 2/2018 | Hentschel | H04W 4/60 |

FOREIGN PATENT DOCUMENTS

| | | | |
|---|---|---|---|
| CN | 203444251 | * | 2/2014 |
| CN | 105980952 A | | 9/2016 |

(Continued)

OTHER PUBLICATIONS

International Search Report in corresponding PCT application PCT/CN2018/087575, dated Feb. 11, 2019.

*Primary Examiner* — Regina N Holder
(74) *Attorney, Agent, or Firm* — Westbridge IP LLC (57) ABSTRACT

Disclosed is an AI voice interaction device, including a main body and an earphone detachably connected with the main body. User's voice is picked up by a voice pick-up, digital voice signals are obtained through analog-to-digital conversion, and are further transmitted to a first communication module through an earphone communication module. A body processor implements communication connection with a cloud server, and transmits to the cloud server for voice recognition and semantic analysis. Afterwards, the cloud server implements the functions such as making phone calls, sending short messages through the cellular transceiver, or calls corresponding network data, and transmits the network data back to the wristband-type AI voice interaction device to perform corresponding voice broadcasting according to the network data. Further, a TWS earphone and a wristband-type AI voice interaction system are disclosed.

17 Claims, 6 Drawing Sheets

(51) Int. Cl.
  *H04R 1/10*  (2006.01)
  *G06F 40/30*  (2020.01)
  *G06F 3/01*  (2006.01)
  *G06F 3/16*  (2006.01)
  *H04L 29/06*  (2006.01)
  *H04R 1/02*  (2006.01)
  *H04R 5/033*  (2006.01)
  *H04R 5/04*  (2006.01)
  *H04S 1/00*  (2006.01)

(52) U.S. Cl.
  CPC ............ *H04L 65/60* (2013.01); *H04R 1/028* (2013.01); *H04R 1/1016* (2013.01); *H04R 1/1025* (2013.01); *H04R 1/1041* (2013.01); *H04R 5/033* (2013.01); *H04R 5/04* (2013.01); *H04S 1/007* (2013.01); *H04W 4/80* (2018.02); *H04R 2420/07* (2013.01); *H04R 2499/11* (2013.01)

(58) Field of Classification Search
  CPC .... H04R 1/028; H04R 1/1016; H04R 1/1025; H04R 1/1041; H04R 5/033; H04R 5/04; H04S 1/007
  See application file for complete search history.

(56) References Cited

FOREIGN PATENT DOCUMENTS

| | | | |
|---|---|---|---|
| CN | 106094505 | A | 11/2016 |
| CN | 106507249 | A | 3/2017 |
| CN | 106878850 | A | 6/2017 |
| CN | 206533526 | * | 9/2017 |
| CN | 108564949 | A | 9/2018 |

* cited by examiner

TWS EARPHONE, WRISTBAND-TYPE AI VOICE INTERACTION DEVICE, AND SYSTEM

CROSS REFERENCE TO RELATED DISCLOSURE

The present application is a Continuation Application of International Application No. PCT/CN2018/087575, filed May 18, 2018, the entire contents of which are hereby incorporated by reference.

TECHNICAL FIELD

The present disclosure relates to a portable communication device, in particular to a TWS earphone, wristband-type AI voice interaction device, and system.

BACKGROUND

TWS, short for True Wireless Stereo and indicating a true wireless stereo, technically means the wireless left-right channel separation via bluetooth by connecting the mobile phone to the main speaker, and the main speaker connected to the secondary speaker via bluetooth. Once disconnected to the secondary speaker, the main speaker returns to single stereo. The edges of TWS earphones lies in: firstly, the truly wireless communication, which completely abandons wiring troubles; secondly, convenience to user. Both earsphones can be inter-connected wirelessly for a single user to enjoy wonderful stereo sound; while one can also share a same song with another within 10 meters. The left and the right ear can work independently coupling with its own mobile phone.

Despite many benefits, the TWS earphones (including Apple's AirPods) are often easily lost due to omission of the wires. A storage box is typically needed to match with the TWS earphones. In addition, the storage box is also provided with a charging module. Namely, the storage box is also applied as a charging box for supplying power to the TWS earphones. However, the storage box is inconvenient to carry and easy to lose.

Regarding the related TWS (such as Apple's AirPods), the bluetooth adapter is typically set in the intermediate device (charging box) to enable the bluetooth connection between the earphones and the mobile phone. The earphone directly connects to the mobile phone through the bluetooth when voice is specifically transmitted. The TWS earphones cannot leave without the phone when in use. We are increasingly relying on the phones since the emergence of smart phones. Activities can not be completed without phones, such as making phone calls, checking information, listening to music and entertainment. And even such kind of nomophobia has been developed. In fact, Smart phone with surging functions and a larger screen. In addition is not suits for everyone. A simple and pure life without smart phones has become a trend recently for more people to put their phones down and leave their eyes from the dazzling screen.

SUMMARY

Aiming at the deficiency of the related art, the present disclosure proposes a TWS earphone, a wristband-type AI voice interaction device and system, which enables convenience of carrying the TWS earphone and its charging seat, independent use of the TWS earphone no longer of the mobile phones, and reduce in people addiction to mobile phones.

According to one aspect, the present disclosure proposes a waistband-type AI voice interaction device, which includes a main body and an earphone detachably connected with the main body. The main body includes a body housing and a wristband, and the wristband is fixedly connected with the body housing. The body housing defines an earphone groove configured to place the earphone. The earphone placed in the earphone groove is electrically connected with the main body for charging. The body housing includes a first communication module, a second communication module and a body processor electrically connected with the first communication module and the second communication module respectively, and the second communication module includes a mobile data internet accessing module, a cellular transceiver and a WiFi transceiver. The earphone includes in-ear soft rubber disposed at an end and an earphone housing. An earphone communication module, an earphone processor, a loudspeaker and a voice pick-up are built in the earphone housing, in which the earphone processor is electrically connected with the earphone communication module, the loudspeaker and the voice pick-up, respectively. And the earphone communication module is wirelessly connected with the first communication module.

In some embodiments, a body energy storage circuit electrically connected with the body processor is disposed in the body housing, in which the body energy storage circuit is connected with a charging module and an electricity output circuit. The electricity output circuit is connected with the charging module and an electricity output end. The charging module includes a wireless charging module or a USB interface charging module. An earphone energy storage circuit is disposed in the earphone housing, in which the earphone energy storage circuit is connected with an earphone processor and an electricity input end. The electricity output end is coupled with the electricity input end, by a metal contact, a metal thin surface or a metal male-female plug connector.

In some embodiments, the earphone placed in the earphone groove is detachably connected with the main body by magnetic attraction, snap fit or clamp fit. The wristband-type AI voice interaction device includes a lifting mechanism to lift the earphone from the earphone groove.

In some embodiments, the second communication module further includes an e-SIM card module.

In some embodiments, the earphone communication module and the first communication module is wirelessly connected by bluetooth, in which the earphone includes a TWS earphone, a stereo bluetooth earphone, or a unilateral bluetooth earphone. When the earphone is a TWS earphone, both the master earphone and the secondary earphone are configured to pick up a voice signal of a user and send the voice signal to the main body through the first communication module. The main body processor is configured to denoise, compare and merge the voice signal picked up respectively by the master earphone and the secondary earphone, into a single voice signal.

In some embodiments, the second communication module is configured to wirelessly communicate wristband-type AI voice interaction device and a smart home.

In some embodiments, the main body includes a body touch key connected with the body processor and a body LED; and the earphone includes an earphone touch key connected with the earphone processor and an earphone LED.

According to a second aspect, the disclosure proposes a TWS earphone, which is an in-ear type and includes a master earphone and a secondary earphone. The master earphone and the secondary earphone is symmetrical in structure. Each of the master earphone and the secondary earphone includes an in-ear soft rubber, an earphone housing and an upper cover plate.

An earphone PCB, an earphone battery, a loudspeaker and an earphone magnet are disposed in the earphone housing, in which an earphone communication module, an earphone processor, an earphone energy storage circuit and a voice pick-up are built on the earphone PCB.

The earphone battery is disposed below and connected with the earphone PCB. The earphone magnet is disposed below the earphone battery, an electricity input end is adjacent to the earphone magnet, and is electrically connected with the earphone energy storage circuit.

The earphone housing defines a hole configured to extend a metal head of the electricity input end out of the earphone housing. The earphone housing defines a voice pick-up hole opposite to the voice pick-up;

Behind the in-ear soft rubber, a loudspeaker is disposed at an end portion of the earphone.

According to a third aspect, the disclosure proposes a wristband-type AI voice interaction system, which includes a wristband-type AI voice interaction device as described in the first aspect and a cloud server, in which the wristband-type AI voice interaction device is communicatively connected with the cloud server.

In some embodiments, the system includes as follows. the voice picked up by the voice pick-up of the wristband-type AI voice interaction device is subjected to analog-to-digital conversion by the earphone processor to obtain a digital voice signal; the digital voice signal is transmitted to the first communication module through the earphone communication module. The body processor is configured to respond to the digital voice signal, transmit the digital voice signal to the cloud server through the second communication module, log in an interface of the cloud server, and perform voice recognition and semantic analysis on the digital voice signal. In response to a determination that the semantic analysis is completed, the cloud server is configured to call a corresponding network data and sends the corresponding network data to a wristband-type AI voice interaction device, and the earphone of the wristband-type AI voice interaction device is configured to perform a voice broadcasting based on the network data.

According to the above embodiment, the wristband-type AI voice interaction device of the present disclosure allows the TWS earphone to place in the wristband-type charging seat, which is convenient to carry. Since the TWS earphone can be connected with a charging base with the functions of making phone calls, sending information, surfing the Internet and the like, the TWS earphone can be used without any mobile phone. Moreover, since the wristband-type AI voice interaction device of the present disclosure has the functions of calling, sending information, surfing the Internet and the like, and replaces mobile phone through AI voice interaction in respect to the interactive mode, people can reduce their dependency on mobile phones with their demands met by the interactive device. Eyestrain time can be reduced, and eyes can be protected.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

Reference numerals: cloud server 8, body 10, first communication module 11, second communication module 12, body energy storage circuit 13, electricity output circuit 14, electricity output end 15, positioning sensor 16, body processor 19, earphone 20, earphone communication module 21, earphone energy storage circuit 23, electricity input end 25, voice pick-up 27, speaker 28, earphone processor 29, lifting mechanism 30, driving rod 31, left coupling rod 32b, right coupling rod 32a, left crossbar 34b, right crossbar 34a, body PCB 100, body housing 101, wristband 102, left wristband 102a, right wristband 102b, body LED 103, body touch key 104, body magnet device 105, button 106, communication antenna 107, through hole 111, earphone groove 112, left earphone groove 112a, right earphone groove 112b, body battery 130, charging module 138, earphone PCB 200, earphone housing 201, in-ear soft rubber 202, earphone LED 203, earphone touch key 204, earphone magnet 205, voice pick-up hole 206, upper cover 207, earphone battery 230.

DETAILED DESCRIPTION OF THE EMBODIMENTS

Specific embodiments of the present disclosure will be detailedly described hereinafter with reference to the accompanying drawings. In which similar elements in various embodiments have associated and similar reference numerals. In the following embodiments, details are provided to enable better appreciation of the present disclosure. However, those skilled in the art may perceive without creative effort that some of the features may be omitted in different situations or may be replaced by other elements, materials or methods. In some situation, some operations related to the present disclosure are not shown or described in the specification, in order to outline the significant part of the present disclosure. In fact, it is not necessary to describe these related operations in detail for those skilled in the art, as they can fully appreciate the related operations according to the description in the specification and the common technical knowledge in the present field.

In addition, the features, operations or features described in the specification may be combined in any suitable manner to form various embodiments. Additionally, each operation or activity in the method description can also be changed or adjusted in sequence in a manner obvious to those skilled in the art. Therefore, the various ordering in the specification and drawings are only for the purpose of clearly describing a certain embodiment and are not meant to be a fixed order unless otherwise specified, in which a certain order must be followed.

The serial numbers assigned to parts herein, such as "first" and "second", are only used to distinguish the described objects and do not have any order or technical meaning. However, "connection" and "connection" in the present disclosure may include direct and indirect connection (connection) unless otherwise specified.

Embodiment 1

Referring to FIGS. 1 to 8, the present disclosure proposes a wristband-type AI voice interaction device, which includes a main body 10 and an earphone 20 which is detachably connected to the main body.

The main body 10 comprises a body housing 101 and wristband 102a/102b. The wristband 102a/102b are fixedly connected with the body housing 101. The body housing 101 is provided with an earphone groove 112 for placing earphones. And the earphones 20 can be placed in the earphone groove 112 to be electrically connected with the main body 10 and to be charged.

The body housing 101 is internally provided with a first communication module 11, a second communication module 12 and a body processor 19, in which the body processor 19 is electrically connected with the first communication module 11 and the second communication module 12 respectively. The second communication module 12 comprises a mobile data internet accessing module, a cellular transceiver and a WiFi transceiver.

The earphone 20 includes an in-ear soft rubber 202 at an end and an earphone housing 201. The earphone housing 201 is internally provided with an earphone communication module 21, an earphone processor 29, a loudspeaker 28 and a voice pick-up 27. The earphone processor 29 is respectively electrically connected with the earphone communication module 21, the loudspeaker 28 and the voice pick-up 27. The earphone communication module 21 is wirelessly connected with the first communication module 11. The voice pick-up 27 is configured to pick up voice signals outspoken by a user, and the voice signals are processed (analog-to-digital converted) by the earphone processor 29 and then converted into corresponding digital voice signals which are sent out through the earphone communication module 21.

Figure 1:
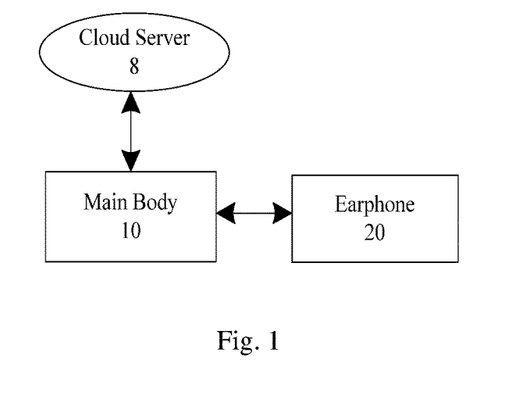
FIG. 1 is a schematic block diagram of a wristband-type AI voice interaction device and system of the present disclosure.
Figure 2:
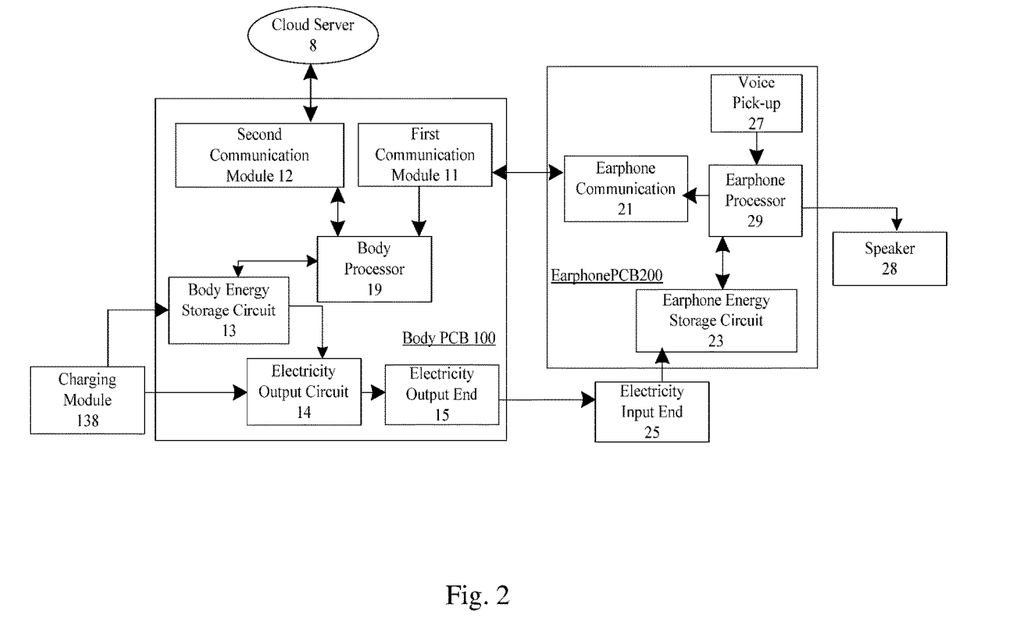
FIG. 2 is a schematic diagram of components in a wristband-type AI voice interaction device and system according to an embodiment.
Figure 3:
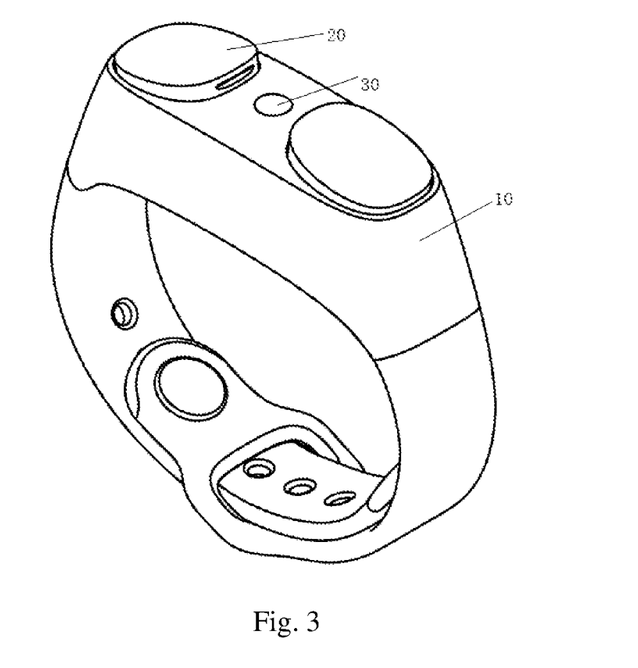
FIG. 3 is a schematic structural view of a wristband-type AI voice interaction device according to an embodiment.

The body processor 19 acquires the digital voice signal from the earphone communication module 21 through the first wireless communication module 11, and response to the digital voice signal. The body processor can be communicated with cloud server 8 through the mobile data internet module or WiFi transceiver, and accesses the cloud server 8 to implement voice recognition and semantic analysis on the digital voice signal.

In which, the data interactions are: the body processor 19 responds to the digital voice signal transmitted by the first wireless communication module 11, sends the digital voice signal to the cloud server 8 through the second wireless communication module 12, logs in the interface of the corresponding cloud server 8 which performs voice recognition and semantic analysis on the digital voice signal. After the analysis is completed, if the analysis result is related to phone calling or message delivering, the analysis result is sent back to the main body 10. And then the main body 10 conducts the functions of making a phone call, sending a short message and the like with known prior art knowledge through the cellular transceiver. Otherwise, the server 8 implements corresponding processing to the internet data, calls corresponding network data, and sends the network data back to the wristband-type AI voice interaction device. Once the wristband-type AI voice interaction device receives the network data, the earphone implements corresponding voice broadcasting according to the network data. For example, the cloud server 8 can start a program to perform internet search (e.g., Baidu search) and send the search results back to the wristband-type AI voice interactive device and broadcast in a voice form, or start a program to call the network music player resources to play music, or start a navigation program (e.g., Amap) to navigate, or start a program to designate an audio program, etc.

Figure 11:
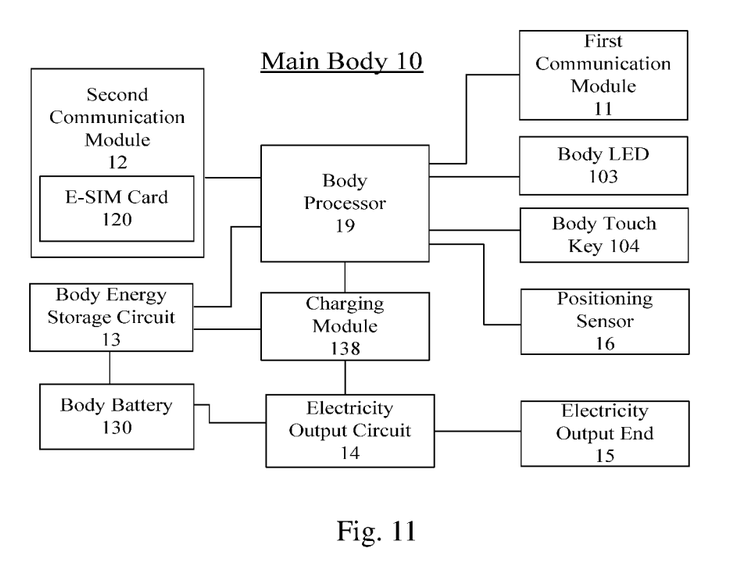
FIG. 11 is a structural block diagram of the body according to an embodiment.

The body housing 101 is further internally provided with a body energy storage circuit 13 electrically connected with the body processor 19, a charging module 138 electrically connected with the main body energy storage circuit 13, and an electricity output circuit 14. The electricity output circuit 14 is further connected with the charging module 138 and the electricity output end 15. And the body energy storage circuit 13 is further connected with a body battery 130 (as shown in FIG. 11).

Figure 8:
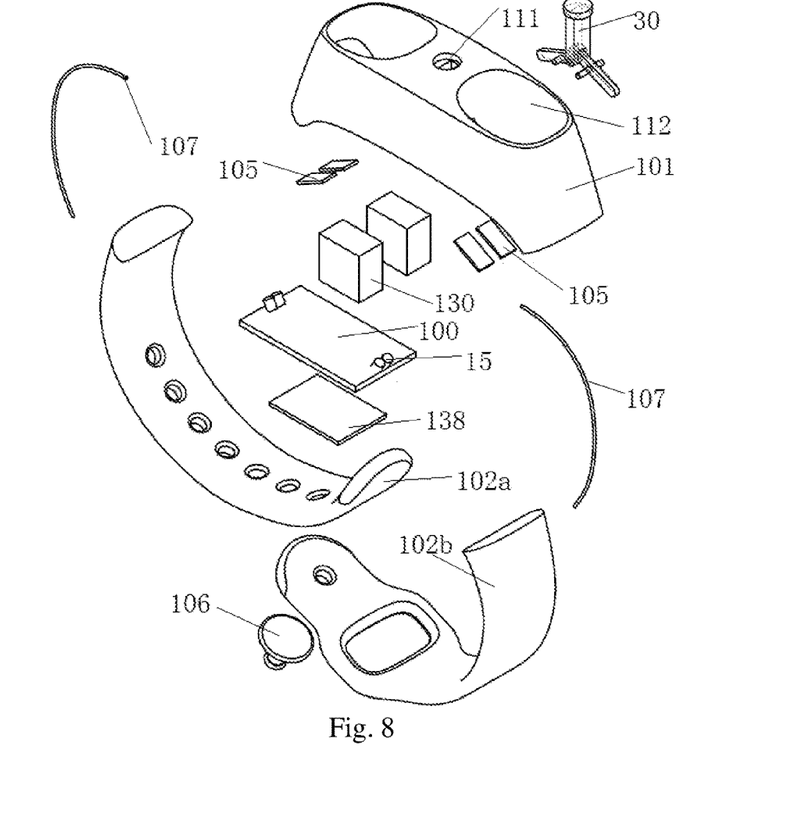
FIG. 8 is an exploded view of a body according to an embodiment.

For above configuration, the first communication module 11, the second communication module 12, the body processor 19, the body energy storage circuit 13, the electricity output circuit 14, the electricity output end 15 and the charging module 138 constitute the basic structure of the main body 10. As shown in FIGS. 2 and 8, in some embodiments, the first communication module 11, the second communication module 12, the body processor 19, the body energy storage circuit 13, the electricity output circuit 14, and the electricity output end 15 are provided on the body PCB 100.

Figure 6:
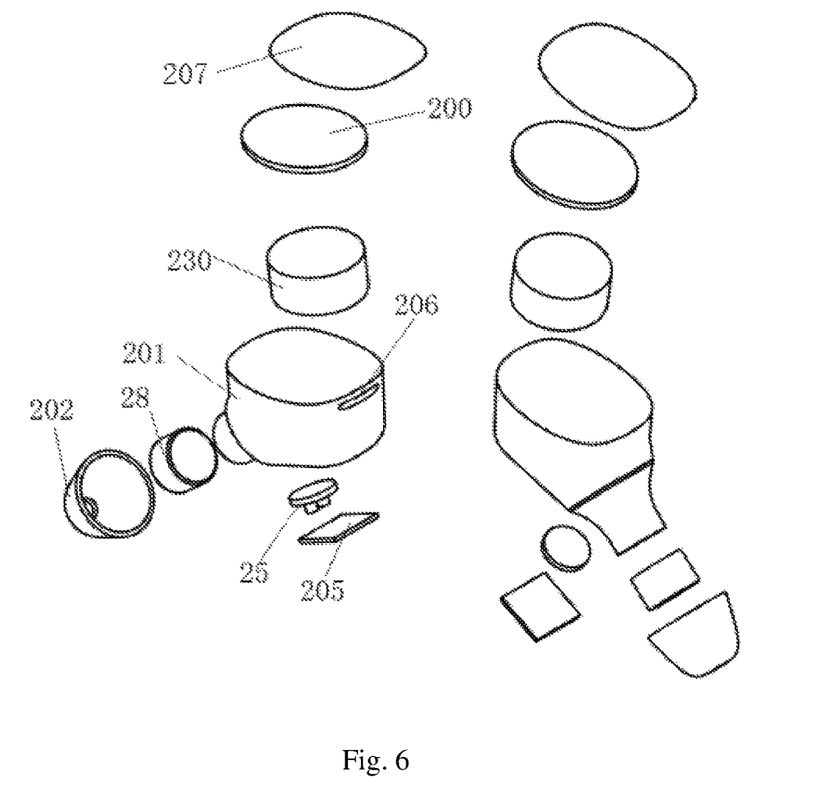
FIG. 6 is an exploded view of an earphone according to an embodiment.
Figure 10:
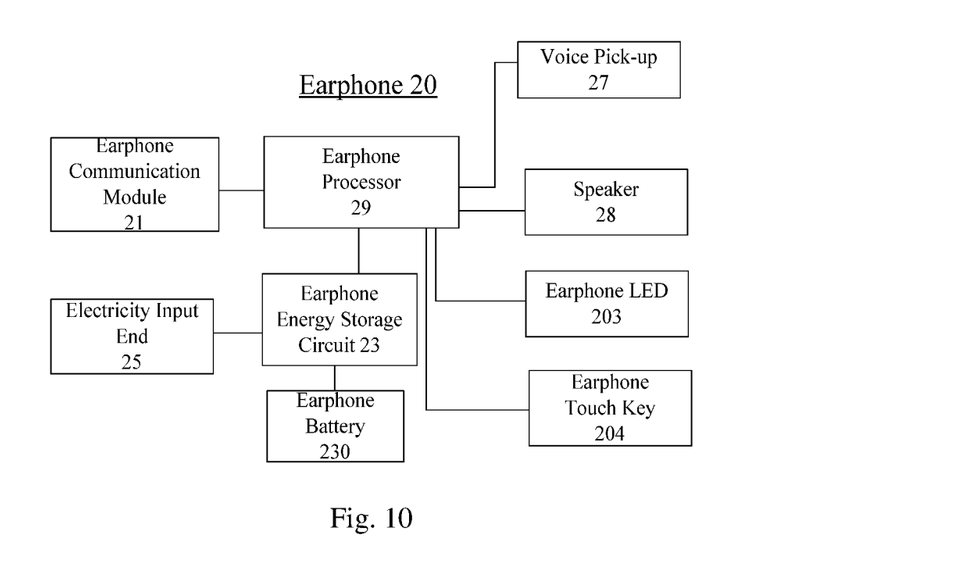
FIG. 10 is a structural block diagram of an earphone according to an embodiment.

The earphone housing 201 is further provided with an earphone energy storage circuit 23 electrically connected with the earphone processor 19, and an electricity input end 25 electrically connected with the earphone energy storage circuit 23. And the earphone energy storage circuit 23 is also connected with an earphone battery 230 (as shown in FIG. 10). The power input end 25 of the earphone is coupled with the electricity output end 15 of the main body, which may include, but not limited to, a metal contact, a metal thin surface, a metal male/female contact etc. The metal contacts are shown in FIGS. 6 and 8.

Figure 5:
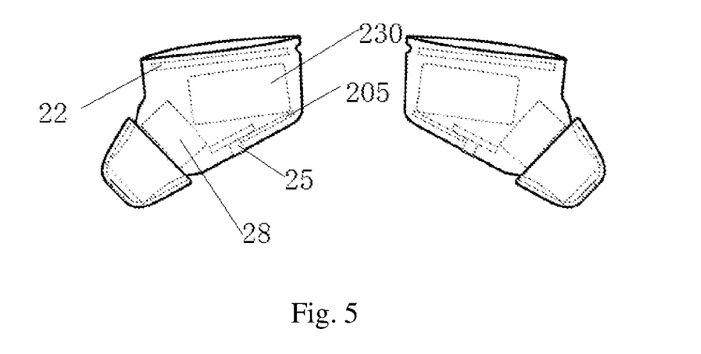
FIG. 5 is a perspective view of an earphone according to an embodiment.

In the above structure, the earphone communication module 21, the earphone processor 29, the speaker 28, the pickup 27, the earphone energy storage circuit 23, and the power input end 25 constitute the basic structure of the earphone 20. As shown in FIGS. 2 and 5, in some embodiments, the earphone communication module 21, the earphone processor 29, the voice pick-up 27, and the earphone energy storage circuit 23 are provided on the earphone PCB 200.

In some embodiments, the charging module 138 includes an existing wireless charging module or a conventional USB interface charging module.

Once the earphone 10 is charged, if the charging module 138 is not connected to an external power source and the earphone 10 is placed in the earphone groove, the main body 10 transmits electricity to the electricity input end 25 through the main body battery 130, the electricity output circuit 14 and the electricity output end 15. The earphone 20 is get charged. If the charging module 138 is connected to an external power source, the main body 10 preferentially utilize the electricity output circuit 14 and the electricity output end 15 to transmit electricity to the electricity input end 25, and then uses the main body energy storage circuit 13 to charge the main body battery 130 once the charging to the earphone 20 is complete.

As such, due to the basic structure of the body 10 and the earphone 20, the wristband-type AI voice interaction device picks up the user's voice through the voice pick-up 27, converts it into a digital voice signal through the earphone processor 29, and transmits it to the first communication module 11 through the earphone communication module 21. The body processor responses to the digital voice signal, and can communicate with the cloud server 8 through the mobile data internet module or WiFi transceiver, and transmits the voice signal to the cloud server 8. In which, after the digital voice signal has been transmitted to the cloud server 8, the cloud server 8 implements voice recognition and semantic analysis. Once the analysis is completed, if the analysis result is associated with phone calling or message sending, the analysis result is transmitted back to the AI voice interaction device. Then these functions such making a phone call, sending a message and the like are implemented through the cellular transceiver which has been described in the prior art. Otherwise, the cloud server implements corresponding Internet data processing and calls corresponding network data. The network data would be transmitted back to the wristband-type AI voice interaction device. Receiving the network data by the wristband-type AI voice interaction device, the earphone performs corresponding voice broadcasting according to the network data.

It should be pointed out that as a large amount of data processing and data analysis are completed by a cloud server of the cloud, which are returned to the wristband-type AI voice interaction device taken by the user on the wrist by means of mobile data communication (3G/4G/5G) or WiFi communication, the wristband-type AI voice interaction device does not need a processor with strong computing capability or an expensive display screen, but only a better communication capability. Compared with mobile phone, the wristband-type AI voice interaction device can not only save the hardware cost, but also be more convenient and intelligent for users, reducing the addition of people to the mobile phone.

Referring to FIGS. 4-8, in some embodiments, the earphone 20 placed in the earphone groove 112 is detachably connected to the main body 10 by magnetic attraction, snap fit or clamp fit. FIGS. 5-8 illustrates a manner in magnetic attraction, where the earphone magnet 205 and the main body magnet 105 are attracted to each other.

In some embodiments, a positioning sensor electrically connected to the body processor 19 is also provided in the body housing 101. The positioning sensor is configured to detect whether the position is accurate of the earphone 20 placed in the earphone groove 112, so as to prevent "virtual connection" between the electricity input end 25 of the earphone and the electricity output end 15 of the main body, to affect the charging of the earphone.

In some embodiments, the wristband-type AI voice interaction device is further provided with a lifting mechanism for separating the earphone 20 from the earphone groove 112.

Figure 4:
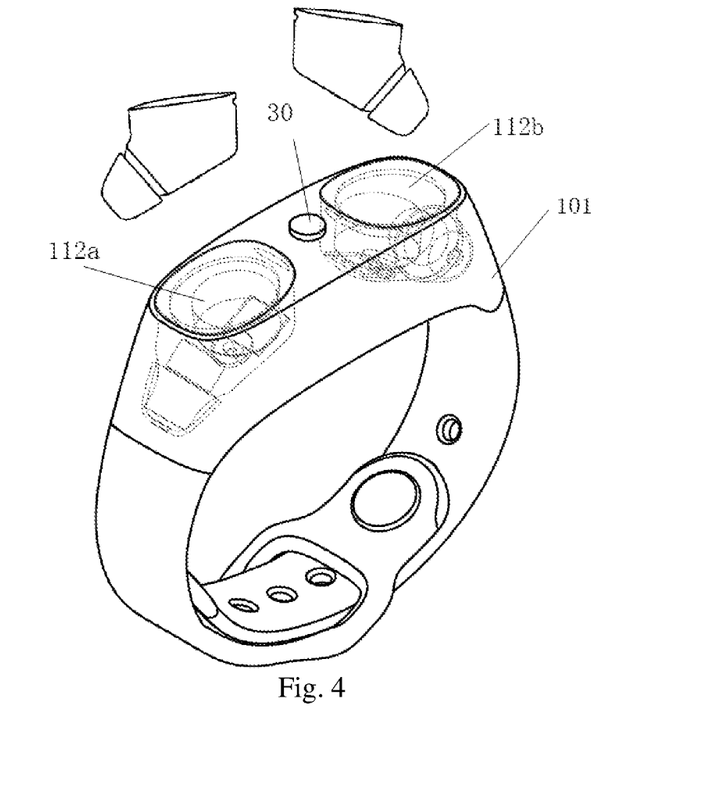
FIG. 4 is a schematic view of a wristband-type AI voice interaction device with separate earphones according to an embodiment.
Figure 7:
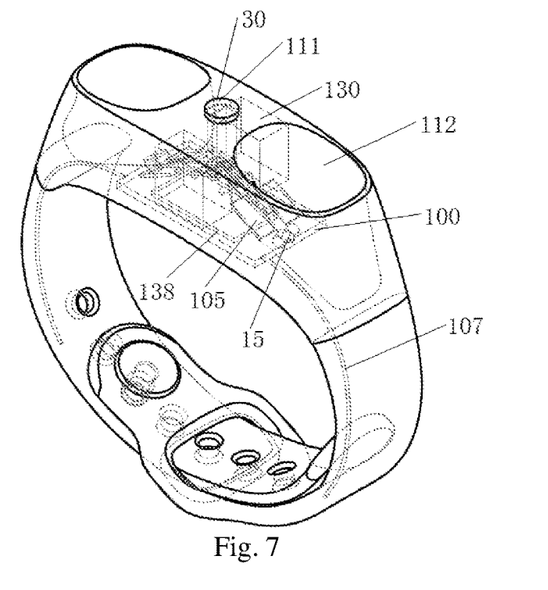
FIG. 7 is a perspective view of a body according to an embodiment.
Figure 9:
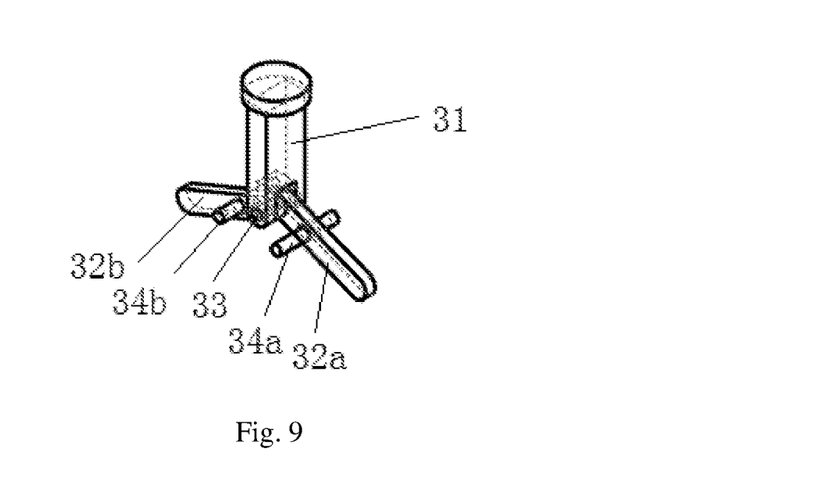
FIG. 9 is a schematic structural view of a lifting mechanism according to an embodiment.

In a specific embodiment, referring to FIGS. 7 and 9, the lifting mechanism 30 has a T-shaped structure which includes a driving rod 31, a left coupling rod 32b and a right coupling rod 32a. The left coupling rod 32b is provided with a left crossbar 34b, the right coupling rod 32a is provided with a right crossbar 34a. And the left coupling rod 32b and the right coupling rod 32a are respectively bolted with the driving rod 31 through a coupling shaft 33. Pressing the driving rod 31 may move the left coupling rod 32b and the right coupling rod 32a up and down. Referring to FIGS. 4 and 7, the end of the driving rod 31 of the lifting mechanism 30 is protruded from the through hole 111 provided in the body housing 101. The left coupling rod 32b and the right coupling rod 32a are provided below the left earphone groove 112a and the right earphone groove 112b, respectively. When the driving rod 31 is pressed, the left coupling rod 32b and the right coupling rod 32a would lift the earphone 20 provided in the earphone groove 112.

Referring to FIG. 11, in some embodiments, the second communication module 12 further includes an e-SIM card module 120. The e-SIM card module 120 is built in the main body 10, so that users do not need to insert their own cards after purchasing the device. Their own operator networks and packages can be directly used by means of software registration or direct purchase. As no independent SIM card slot is necessary, the main body 10 has a lighter and thinner body, with a lower manufacturing cost.

Referring to FIGS. 7 and 8, in some embodiment, the wristband 102a/102b is further provided with a communication antenna 107, which is electrically connected to the second communication module 12. The wristband 102a and the wristband 102b are buckled and fixed by the button 106, so that the main body 10 can be comfortably worn on the user's wrist.

In some embodiments, the earphone communication module 21 and the first communication module 11 can be wirelessly connected through WiFi, bluetooth or infrared wireless connection. Preferably, in some embodiment, the earphone communication module 21 and the first communication module 11 can be wirelessly connection via bluetooth, that is, the earphone communication module 21 and the first communication module 11 both includes a bluetooth module. As such, the earphone 20 can be a TWS earphone, a classic stereo bluetooth earphone or a classic unilateral bluetooth earphone.

When the earphone 20 is a TWS earphone (refer to FIGS. 3 to 6), the main earphone is placed in the left earphone groove 112a and the secondary earphone is placed in the right earphone groove 112b.

When the voice is played, the main earphone acquires the voice signal (including conversation voice, message text voice signal and network data transmitted back from the cloud server 8, etc.) from the main body 10 via the earphone communication module 21. After acquiring the voice signal, the main earphone transmits the voice signal to the main earphone speaker for playing, and forwards the voice signal to the secondary earphone by means of near field communication such as microwave communication.

When picking up a user's voice signal, either the master earphone or the secondary earphone can pick up the user's voice signal and transmit it to the main body 10 through the first communication module 11. The main body processor 19 will denoise and compare the user's voice respectively picked up by the master earphone and the secondary earphone, and merge them into one voice signal.

In some embodiments, the second communication module 12 can also be configured to realize wireless communication connection between the wristband-type AI voice interaction device and the existing smart home device, so as to further control the smart home device through AI voice, making the wristband-type AI voice interaction device become a "remote controller" of the smart home. Specifically, the earphone 20 picks up a voice command out spoken by a user, the earphone processor 29 responses to the voice command and transmits the voice command to the first communication module 11 of the main body through the earphone communication module 21. The body processor 19 responses to the voice command, and transmits the voice command to the smart home device through the second communication module 12, so that the smart home performs operations such as starting, shutting down, adjusting temperature and the like.

Referring to FIG. 11, in some embodiments, the main body 10 is further provided with a body touch key 104 connected to the body processor 19 and a body LED 103. The body LED 103 includes an electricity indicator, a SIM card indicator, a WiFi lamp, and a voice indicator. For example, (1) The electricity indicator is set as 4 cells when displaying the electricity, 1) when the electricity indicator is more than 75% and less than or equal to 100%, four cells are indicated on;

2) when the electricity indicator is more than 50% and less than or equal to 75%, three cells are indicated on;

3) when the electricity indicator is more than 25% and less than or equal to 50%, two cells are indicated on;

4) when the electricity indicator is more than 10% and less than or equal to 25%, one cells are indicated on;

5) when the electricity indicator is less than or equal to 10%, one cell is breathing;

(2) When the SIM card indicator indicates, a green light-on indicates that signal is valid, a flickering light indicates network search, and light-off indicates no service.

(3) When WiFi indicator indicates, a green light-on indicates that signal is valid, a flickering light indicates network search, and light-off indicates no service.

In which, when data is transmit, breathing of the green light of WiFi indicates using a WiFi stream flow, breathing of the green light of SIM card indicates using a SIM card stream flow. WiFi stream flow is preferred.

(4) when voice indicator indicates, the green light will be on when woke up, the green light will flicker when searching, and the green light will breathe when broadcasting.

Referring to FIG. 10, in some embodiments, the earphone 20 is further provided with an earphone touch key 204 connected to the earphone processor 29 and an earphone LED 203.

The wristband-type AI voice interaction device of the disclosure has three modes, respectively being a charging mode, a standby mode and a voice interaction mode.

Charging mode: the earphone 20 is placed on the main body 10, the electricity output end 15 is electrically connected with the power input end 25, the main body 10 only charges the earphone 20, and turns off once the earphone being fully charged;

Voice interaction mode: the earphone 20 is taken out from the earphone groove 112 and separated from the main body 10. The earphone communication module 21 is connected with the first communication module 11 in wireless communication, and the earphone 20 and the main body 10 are automatically turned on to perform voice interaction;

Standby mode: if the earphone 20 fails to interact with the main body 10 within a preset time, the earphone 20 enters to sleep mode, while the main body 10 enters standby mode. The earphone 20 and the main body 10 can be awakened by touching the earphone touch key 204.

In some embodiments, by pressing the earphone touch key 204 for a long time, the earphone 20 can transmit signal to search for the main body 10 through the earphone communication module 21. When the main body 20 receives the searching signal through the first communication module 11, all the indicator lights of the main body LED 103 will flicker at a high frequency, thus helping the user to retrieve the lost main body 20. By pressing the body touch key 104 for a long time, the body 10 can transmit a signal for searching the earphone through the first communication module 11. When the earphone 20 receives the searching signal through the earphone communication module 21, all the indicator lights of the earphone LED 204 will flicker at a high frequency and the speaker 28 will out speak an alert sound, helping the user to retrieve the lost earphone. It can be appreciated that the wristband-type AI voice interaction device of the present disclosure has a lost-found function, which can prevent the earphone or charging seat (body 10) from being lost. Therefore, compared with the existing earphone charging base (including the existing TWS earphone charging base), the wristband-type AI voice interaction device is not only convenient to carry, but also makes the earphone and the charging base not easy to lose due to this function.

For above, the wristband-type AI voice interaction device of the present disclosure places the TWS earphone in the wristband-type charging seat (body), which can make the TWS earphone and its charging seat convenient to carry. As the TWS earphone can be connected with a charging base (body) having the functions of making phone calls, sending information, surfing the Internet and the like, the TWS earphone can be used without relying on a mobile phone. Moreover, since the wristband-type AI voice interaction device of the present disclosure has the functions of calling, sending information, surfing the Internet and the like, which may replace the interaction mode of mobile phone screen operation through AI voice interaction, daily needs can be met. One can reduce his dependence on mobile phones, and eye screen time, so that eyes can be protected.

Embodiment 2

Referring to FIGS. 5 and 6, the present disclosure further proposes a TWS earphone being an in-ear type, which includes a master earphone and a secondary earphone. The master earphone and the secondary earphone are symmetrical in structure, and both the master earphone and the secondary earphone includes an in-ear soft rubber 202, an earphone housing 201 and an upper cover 207.

The earphone housing 201 is internally provided with an earphone PCB 200, an earphone battery 230, a speaker 28 and an earphone magnet 205, and the earphone PCB 200 is provided with an earphone communication module 21, an earphone processor 29, an earphone energy storage circuit 23 and a voice pick-up 27. The earphone processor 19 is electrically connected with the earphone communication module 21, the pickup 27, the speaker 28 and the earphone energy storage circuit 23, respectively. The earphone energy storage circuit 23 is also electrically connected with the earphone battery 230 and the electricity input/output end 25.

An upper cover plate 207 is provided above the earphone PCB 200, and an earphone battery 230 is provided below the earphone PCB 200, and the earphone battery 230 is electrically connected with the earphone PCB 200. An earphone magnet 205 is arranged below the earphone battery 230, and an electricity input end 25 is arranged next to the earphone magnet 205. The electricity input end 25 is electrically connected with the earphone energy storage circuit 23.

The earphone housing 201 is provided with a corresponding hole for the end of the metal head of the power input end 25 to extend out of the earphone housing 201 and to electrically connect with the electricity output end 15 arranged in the body housing. The earphone housing 201 is also provided with a voice pick-up hole 206, the position of which is corresponding to the voice pick-up 27, so that the voice pick-up 27 picks up a voice signal of a user.

The speaker 28 is disposed at the end of the earphone 20 and behind the in-ear soft rubber 202, to help the user to hear the conversation voice, short message text conversion voice and network data conversion voice received by the earphone communication module 21.

When the voice is played, the main earphone acquires the electric signal (including conversation voice, message text voice signal and network data transmitted back from the cloud server 8, etc.) from the external device (including mobile phones, the main body 10 and the like) via the earphone communication module 11 (bluetooth module). After acquiring the voice signal, the main earphone transmits the voice signal to the main earphone speaker for playing, and forwards the voice signal to the secondary earphone by means of near field communication such as microwave communication. When picking up a user's voice signal, either the master earphone or the secondary earphone can pick up the user's voice signal and transmits the voice signal through the first communication module 11 (bluetooth module).

The earphone of the present embodiment can be placed on the charging seat (main body 10) of the first embodiment for charging, or can be placed on the existing TWS earphone charging seat for charging. Charging is relatively flexible. Not only can it be wirelessly connected with the body 10 in the first embodiment and used as a wristband-type AI voice interaction device, but also can be connected with the existing mobile phone bluetooth, used as a general TWS earphone. Alternatively, the earphone can be connected with other bluetooth devices, and used as a common bluetooth earphone. Namely, the TWS earphone has good adaptability and rather complete functions.

Embodiment 3

Referring to FIG. 1 and FIG. 2, the present disclosure further proposes a wristband-type AI voice interaction system, which includes the wristband-type AI voice interaction device as described in embodiment 1 and a cloud server 8. The wristband-type AI voice interaction device is communicatively connected with the cloud server 8.

The data processing of the wristband-type AI voice interaction system includes:

Voice recognition phase: the user's voice picked up by the voice pick-up 27 is analog-to-digital converted by the earphone processor 29, which is then transmit to the first communication module 11 through the earphone communication module 21. In response to the digital voice signal, the body processor transmits the digital voice signal to the cloud server 8 through the second communication module 12. After the cloud server 8 receives the digital voice signal, the cloud server logs into the corresponding interface to perform voice recognition and semantic analysis on the digital voice signal.

Data calling phase: after the analysis is completed, the cloud server 8 calls corresponding network data, search to obtain search results using engines such as Baidu search, or call a network music player to obtain song audio resources; or the cloud server 8 calls to perform search, route planning, navigation data, etc. by using Amap, and transmits these network data to the wristband-type AI voice interaction device;

Voice broadcasting phase: after receiving the network data transmit by the cloud server 8 through the second communication module 12, the wristband-type AI voice interactive device transmits the network data to the earphone 20 through the first communication module 11, so that the earphone 20 may perform corresponding voice broadcasting through the speaker 28 according to the network data.

Regarding the wristband-type AI voice interaction system of the present disclosure, as a large amount of data processing and data analysis are completed by a cloud server of the cloud, which are returned to the wristband-type AI voice interaction device taken by the user on the wrist by means of mobile data communication (3G/4G/5G) or WiFi communication, the wristband-type AI voice interaction device does not need a processor with strong computing capability or an expensive display screen, but only a better communication capability. Compared with mobile phone, the wristband-type AI voice interaction device can not only save the hardware cost, but also be more convenient and intelligent for users, reducing the addition of people to the mobile phone.

Those skilled in the art should appreciate that all or part of the functions of the various methods in the above embodiments can be implemented by hardware or by computer programs. When all or part of the functions in the above embodiments are implemented by computer programs, the programs may be stored in a computer readable storage medium, which may include read only memory, random access memory, diskette, CD-ROM, hard disk, etc. The programs are executed by a computer to implement the above functions. For example, the programs are stored in the memory of the device. All or part of the above functions can be implemented when the programs in the memory are executed by the processor. In addition, when all or part of the functions in the above embodiments are implemented by computer programs, the programs can also be stored in a storage medium such as a server, another computer, a diskette, a CD-ROM, a flash disk or a removable hard disk. All or part of the functions in the above embodiments can be implemented when the program in the memory is executed by a processor by downloading or copying the program into the memory of the local device or updating the version of the system of the local device.

The above disclosure of specific embodiments to illustrate the present disclosure is only for the purpose of assist appreciation of the present disclosure and is not intended to limit the present disclosure. For those skilled in the prior arts to which the present disclosure belongs, several simple deduction, modification or substitution can be perceived according to the concept of the present disclosure.

What is claimed is:

1. A wristband type AI voice interaction device, comprising:
   an earphone, configured to play and pick up a voice signal, wherein the earphone comprises an earphone communication module, an earphone processor, a loudspeaker a voice pick-up, and a lifting mechanism having a T-shape, wherein the earphone processor is electrically connected with the earphone communication module, the loudspeaker and the voice pick-up, respectively; and
a main body detachably connected with the earphone, comprising:
an earphone groove configured to place the earphone and electrically connect with the main body when the earphone is placed in the earphone groove for charging;
a first communication module, configured to wirelessly connected with the earphone communication module;
a second communication module, comprising at least one of a mobile data internet accessing module, a cellular transceiver and a WiFi transceiver; and
a main body processor, connected with the first communication module and the second communication module, respectively, wherein
the lifting mechanism is configured to lift the earphone from the earphone groove,
the earphone groove comprises a first earphone groove and a second earphone groove; and
the lifting mechanism comprises:
a driving rod, wherein an end of the driving rod is extended out of a through hole disposed on a body housing;
a first coupling rod disposed below the first earphone groove; and
a second coupling rod disposed below the second earphone groove.

2. The device of claim 1, wherein the main body further comprises:
a body energy storage circuit electrically connected with the main body processor;
a charging module electrically connected to the main body energy storage circuit, wherein the charging module comprises at least one of a wireless charging module and a USB interface charging module; and
an electricity output circuit connected with an electricity output end.

3. The device of claim 2, wherein the earphone further comprises:
an earphone energy storage circuit connected with the earphone processor; and
an electricity input end coupled with the electricity output end, and configured to electrically connect between the earphone and the main body.

4. The device of claim 1, wherein the main body further comprises:
a positioning sensor configured to detect a position of the earphone placed in the earphone groove,
wherein the body processor is connected with the positioning sensor, to determine whether the earphone is virtually connected with the main body.

5. The device of claim 1, wherein the earphone is detachably connected with the main body by one of magnet, snap fit or clamp fit.

6. The device of claim 1, wherein
when the end of the driving rod is pressed, the first coupling rod is configured to lift a first earphone placed in the first earphone groove from the first earphone groove, and
the second coupling rod is configured to lift a second earphone placed in the second earphone groove from the second earphone groove.

7. The device of claim 1, wherein the earphone comprises:
a master earphone configured to pick up a voice signal and transmit the voice signal to the main body via the first communication module; and
a secondary earphone configured to pick up another voice signal and transmit the another voice signal to the main body via the first communication module, and
the body processor of the main body is configured to denoise, compare, and merge the two voice signals respectively picked up by the master earphone and the secondary earphone into a single voice signal.

8. The device of claim 1, wherein
the earphone is at least one of TWS earphone, classic stereo bluetooth earphone and classic unilateral bluetooth earphone; and
the earphone groove is disposed on a body housing.

9. The device of claim 1, wherein
the second communication module is configured to communicate between wristband-type AI voice interaction device and a smart home/a mobile phone.

10. The device of claim 1, wherein
the second communication module is configured to wirelessly communicate the main body with a cloud server, and to allow the cloud server to acquire a corresponding network data through voice recognition, semantic analysis and retrieval based on a digital voice signal received from the second communication module.

11. The device of claim 1, wherein the second communication module further comprises an e-SIM card module.

12. The device of claim 1, wherein
the main body comprises a body touch key connected with the body processor and a body LED connected with the body processor; and
the earphone comprises an earphone touch key connected with the earphone processor and an earphone LED connected with the earphone processor.

13. The device of claim 12, wherein the body LED comprises at least one of the following:
a power indicator configured to indicate a power of the main body,
a SIM card indicator configured to indicate a state of the SIM card,
a WiFi indicator configured to indicate a state of WiFi, and
a voice indicator configured to indicate a voice state.

14. The device of claim 12, wherein
the earphone communication module is configured to transmit a signal to search for the main body when the earphone touch key is pressed longer than a preset time.

15. A wristband-type AI voice interaction system, comprising:
a wristband-type AI voice interaction device as recited in claim 1, and
a cloud server communicatively connected with the device and configured to receive a digital voice signal transmitted by the second communication module.

16. The system of claim 15, wherein:
a user's voice picked up by the voice pick-up of the wristband-type AI voice interaction device is subjected to analog-to-digital conversion by the earphone processor to obtain a digital voice signal;
the digital voice signal is transmitted to the first communication module through the earphone communication module;
the main body processor is configured to respond to the digital voice signal, transmit the digital voice signal to the cloud server through the second communication module, log in an interface of the cloud server, and perform voice recognition and semantic analysis on the digital voice signal;

in response to a determination that the semantic analysis is completed, the cloud server is configured to call a corresponding network data and send the corresponding network data to the wristband-type AI voice interaction device, and the earphone of the wristband-type AI voice interaction device is configured to perform a voice broadcasting based on the network data.

17. A method for AI voice interaction, comprising:

generating, by an earphone processor of a wristband-type AI voice interaction device, a digital voice signal by analog-to-digital conversion of a user's voice picked up by a voice pick-up;

acquiring, by a cloud server, the digital voice signal from a second communication module of a main body of the wristband-type AI voice interaction device, wherein the second communication module comprises at least one of a mobile data internet accessing module, a cellular transceiver and a WiFi transceiver;

transmitting, by an earphone communication module of the wristband AI voice interaction device, the digital voice signal to a first communication module of the main body;

implementing voice recognition and semantic analysis based on the digital voice signal;

calling corresponding network data; and transmitting the corresponding network data to the wristband AI voice interaction device, to allow the earphone of the wristband AI voice interaction device to perform voice broadcasting according to the network data, wherein the wristband-type AI voice interaction device comprises:

an earphone, configured to play and pick up a voice signal, wherein the earphone comprises an earphone communication module, an earphone processor, a loudspeaker, a voice pick-up, and a lifting mechanism having a T-shape, wherein the earphone processor is electrically connected with the earphone communication module, the loudspeaker and the voice pick-up, respectively; and a main body detachably connected with the earphone, comprising:

an earphone groove configured to place the earphone and electrically connect with the main body when the earphone is placed in the earphone groove for charging;

a first communication module, configured to wirelessly connected with the earphone communication module;

a second communication module, comprising at least one of a mobile data internet accessing module, a cellular transceiver and a WiFi transceiver; and a main body processor, connected with the first communication module and the second communication module, respectively, wherein the lifting mechanism is configured to lift the earphone from the earphone groove, the earphone groove comprises a first earphone groove and a second earphone groove; and the lifting mechanism comprises:

a driving rod, wherein an end of the driving rod is extended out of a through hole disposed on a body housing;

a first coupling rod disposed below the first earphone groove; and a second coupling rod disposed below the second earphone groove.

\* \* \* \* \*